Figure 1:
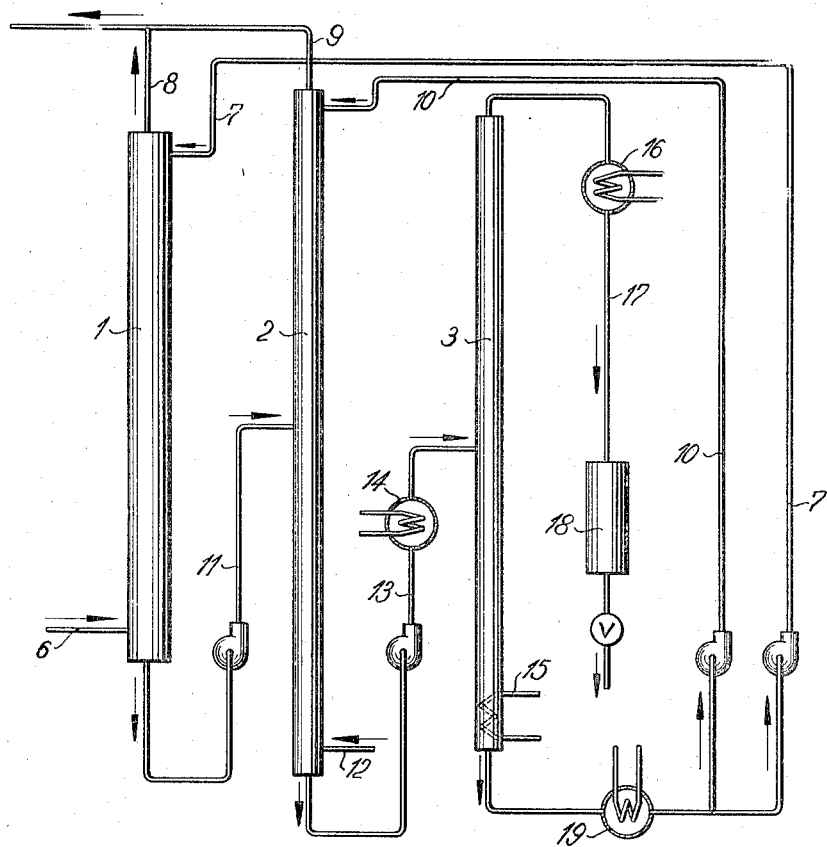

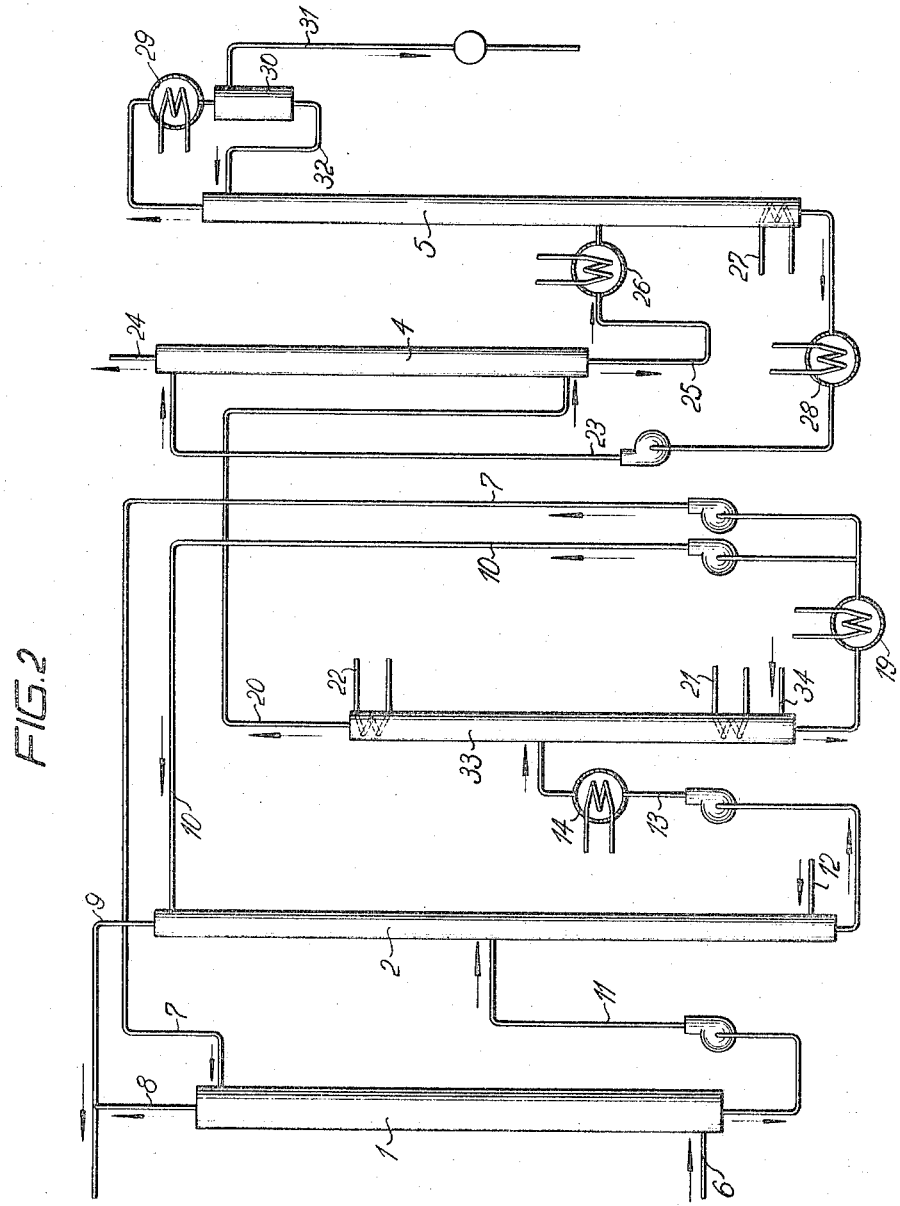

United States Patent Office 3,305,308
Patented Feb. 21, 1967

3,305,308
PROCESS FOR ISOLATING HYDROCYANIC ACID OR MIXTURES OF HYDROCYANIC ACID WITH NITRILES FROM GAS MIXTURES CONTAINING AMMONIA
Kurt Sennewald, Wilhelm Vogt, and Joachim Kandler, Knapsack, near Cologne, and Rolf Sommerfeld, Stetten-Remstal, Germany, assignors to Knapsack Aktiengesellschaft, a corporation of Germany
Filed Nov. 6, 1962, Ser. No. 235,648
Claims priority, application Germany, Nov. 22, 1961, K 45,263
19 Claims. (Cl. 23—151)

The present invention relates to a process for isolating and recovering hydrocyanic acid or mixtures of hydrocyanic acid with nitriles from gas mixtures containing ammonia. The nitriles include in particular unsaturated nitriles, such as methacrylonitrile and acrylonitrile, and saturated nitriles, such as acetonitrile and propionitrile. The invention also relates to an apparatus suitable for use in carrying out the present process.

In the processes customarily used for isolating hydrocyanic acid or mixtures of hydrocyanic acid with nitriles from gas mixtures containing ammonia, the gas is washed with a dilute, aqueous mineral acid, for example sulfuric acid, with the resultant dissolution of the nitriles and hydrocyanic acid, and the ammonia is neutralized. The dissolved constituents are then recovered by distillation. An ammonium salt, for example ammonium sulfate, can be isolated from the aqueous solution as a by-product. The use of acid wash liquids is obligatory since free ammonia on the one hand reacts with unsaturated nitriles, such as methacrylonitrile and acrylonitrile, with the formation of corresponding amines, and on the other hand causes the hydrocyanic acid to polymerize.

In these known processes, the ammonia is neutralized rather reluctantly when it is desired to obtain it in free form. Especially in the case where the gas contains substantial amounts of ammonia, the loss of free ammonia, due to the formation of ammonium sulfate, may become intolerably high from an economical point of view.

Gas mixtures containing ammonia are obtained, for example, in various catalytical processes which are carried out in the gaseous phase and use hydrocarbons, ammonia and optionally oxygen or air as the starting materials. Such reactions include, for example, the manufacture of hydrocyanic acid from methane, ammonia and optionally oxygen or air, and the preparation of acrylonitrile with its accompanying by-products acetonitrile and hydrocyanic acid from olefins, for example propylene, ammonia and oxygen or air. The gas mixtures leaving the reaction zone then generally contain the desired reaction product, and in addition unreacted hydrocarbons and ammonia. Depending on the quantity of such unreacted starting material, it may be indispensable for reasons of economy to return such unreacted starting material to the reaction zone. Still further, it is often advantageous in order to obtain a good yield of desired products to maintain the percent conversion intentionally low. In this case, a large proportion of ammonia and hydrocarbon will remain in the off-gas so that it is necessary to conduct these substances in a cycle.

The terms "yield and conversion" as used herein are defined as follows:

Conversion in percent:
$$\frac{\text{mols ammonia or hydrocarbon reacted}}{\text{mols ammonia or hydrocarbon introduced}} \cdot 100$$

Yield in percent:
$$\frac{\text{gram atoms nitrogen or carbon in hydrocyanic acid and nitriles}}{\text{reacted gram atoms nitrogen or carbon in ammonia and hydrocarbons}} \cdot 100$$

In U.S. patent application Serial No. 130,146 is described a process for the manufacture of acrylonitrile and ammonia from gaseous mixtures. In one embodiment of the invention disclosed in that application the reaction mixture obtained in the manufacture of acrylonitrile from propylene, ammonia and air or oxygen is used as the starting gas for the washing operation defined below, during which acetonitrile as a by-product is isolated together with the acrylonitrile, the hydrocyanic acid contained in the reaction gases and ammonia in excess remaining in the residual gas. The liquids used for washing include unpolar or slightly polar solvents, such as trimethylbenzenes, cumene, diphenyl, tetrahydronaphthalene, α-ethylnaphthalene or the like, in which acrylonitrile and acetonitrile dissolve while ammonia and optionally hydrocyanic acid escape gaseous. The process disclosed in that application admittedly enables the ammonia to be recovered in free form but, due to the small polarity of the solvents used, the hydrocyanic acid which may be present is impossible to remove by washing together with acrylonitrile and acetonitrile.

An essential feature of the process of the present invention thus resides in the use of an appropriate wash liquid which must have the following properties or fulfill the following requirements:

High dissolving power for nitriles and hydrocyanic acid;

Small dissolving power for ammonia and hydrocarbons;

Dissolved traces of ammonia substantially should not react with the unsaturated nitriles during the necessary sojourn times;

The boiling point should sufficiently differ from that of the nitriles and the hydrocyanic acid washed out which are subsequently distilled;

Thermal stability.

Furthermore, the amounts of solvent entrained corresponding to its partial pressure on returning the hydrocarbon, for example propylene, and the ammonia to the reaction zone, should not involve disadvantages, for example due to intoxication of the catalyst which may have been used.

The present invention is based on the unexpected observation that various solvents which contain nitrile groups and accordingly are chemically related to the nitriles and the hydrocyanic acid to be absorbed, comply particularly with the above requirements. These solvents include the following nitriles, for example:

| List of nitriles— | Boiling point in centigrade degrees |
|---|---|
| β-methoxypropionitrile | 164 |
| β-ethoxypropionitrile | 167–173 |
| β-n-propoxypropionitrile (under 24 mm. mercury) | 85–89 |
| β-i-propoxypropionitrile (under 24 mm. mercury) | 83–85 |
| β-n-butoxypropionitrile | 206 |
| β-i-butoxypropionitrile | 193–195 |
| β-pentoxypropionitrile | 218 |
| β,β'-dicyanodiethylether (under 1 mm. mercury) | 119–120 |
| β-cyclopentoxypropionitrile (under 22 mm. mercury) | 122 |
| β-cyclohexoxypropionitrile (under 20 mm. mercury) | 130–132 |
| β-benzoxypropionitrile (under 0.5 mm. mercury) | 114–116 |

These nitriles can readily be prepared from the corresponding alcohols and acrylonitrile. The β,β'-dicyanodiethylether can be obtained from acrylonitrile and water. The β-methoxypropionitrile, β-ethoxypropionitrile and β,β'-dicyanodiethylether are especially advantageous from an economical point of view.

In the process of the present invention, the ammonia is maintained in free form and it can be cycled without difficulty. The hydrocarbons as well remain undissolved and can be used again together with the ammonia.

The process of the present invention thus resides in the use of solvents containing nitrile groups, their use being combined with conventional process steps which, however, form an integrating part of the present invention.

An advantageous mode of executing the process of the present invention is now described in greater detail with reference to the flow scheme illustrated in FIG. 1 of the accompanying drawing, the gas mixture consisting of ammonia, air and olefins containing but small amounts of hydrocyanic acid in addition to the nitriles (molar ratio of hydrocyanic acid:nitrile≦3:7).

The gas mixture containing ammonia, hydrocarbon, nitriles and small amounts of hydrocyanic acid enters through line 6 into wash tower 1 which is charged from above through line 7 with the wash liquid, for example β,β'-dicyanodiethylether. The ammonia-containing gas mixture, freed from the nitriles and hydrocyanic acid, escapes at the top of the wash column through line 8. The wash liquid is conducted from wash tower 1 through line 11 to expelling (stripping) column 2 into the sump of which an inert expelling gas, for example oxygen or air, is introduced at 12 to remove in column 1 dissolved ammonia and hydrocarbon from the wash liquid by blowing. A small amount of wash liquid is introduced at the top of expelling column 2 through line 10 to re-wash nitriles and hydrocyanic acid blown out. The off-gas escaping at 9 contains ammonia and optionally hydrocarbons but is free from nitriles and hydrocyanic acid, while the wash liquid flowing off through line 13 contains all the nitriles and the hydrocyanic acid and is substantially free from ammonia and hydrocarbons. The wash liquid travels through pre-heater 14 to the distilling column 3, the material in the sump of that column being heated to boiling by means of heater 15. The nitriles and hydrocyanic acid dissolved in the wash liquid may also be distilled off under reduced pressure if the boiling point of the wash liquid would be too high under normal conditions. An immaterial resplitting of the wash nitrile into acrylonitrile and the corresponding alcohol at high temperatures is harmless. The nitriles are removed at the top of the distilling column and small amounts of hydrocyanic acid are removed through cooler 16, line 17 and collecting vessel 18. The completely distilled wash liquid flowing off from the sump of the distilling column 3 is returned through cooler 19 to lines 7 and 10, the cooler 19 being advantageously combined in the usual manner with pre-heater 14 to produce a heat exchange effect.

Another mode of executing the process of the present invention is now described with reference to the flow scheme illustrated in FIG. 2 of the accompanying drawing, the starting gas mixture which consists of ammonia, air and olefins containing in addition to the nitriles a considerable amount of hydrocyanic acid or exclusively hydrocyanic acid (molar ratio of hydrocyanic acid to nitrile>3:7).

If the wash liquid flowing off through line 13 contains considerable amounts of hydrocyanic acid, the process illustrated by the flow scheme of FIG. 1 of the accompanying drawing gives rise to polymerizations in the distilling column for the reason that minor amounts of ammonia may remain in the wash liquid even after blowing. In this case, it is advantageous to operate as follows along the scheme of flow represented in FIG. 2 of the accompanying drawing.

The wash liquid conducted through line 13 and pre-heater 14 is introduced into approximately the center portion of expelling column 33, the sump of which can be heated by an additional heating means 21, the expelling column 33 being charged with expelling gas supplied through line 34. The wash liquid flowing off from the sump of expelling column 33 is returned through heat exchanger (cooler) 19 to supply lines 7 and 10 connected respectively with wash column 1 and expelling column 2. The inert gas charged with hydrocyanic acid and optionally nitriles passes through cooler 22 disposed at the upper end of expelling column 33, where entrained amounts of solvent are condensed, and then travels through line 20 to wash column 4 which is charged through line 23 with 1–2 N-mineral acid, for example sulfuric acid. The washed off-gas escapes at 24 while the sulfuric acid solution containing hydrocyanic acid and nitriles is conveyed through line 25 and pre-heater 26 to distilling column 5 the sump of which is heated at 27. The distilled sulfuric acid wash liquid is repumped through cooler 28 into wash column 4. The product obtained at the top of the column 5 is condensed at 29 and an aqueous mixture of hydrocyanic acid and optionally nitriles is removed through separating vessel 30 and line 31; for example, when acrylonitrile, acetonitrile and hydrocyanic acid are concurrently produced, an aqueous solution of these three substances is obtained in line 31, while an aqueous phase is returned through line 32 into distilling column 5.

The process illustrated by the flow scheme of FIG. 2 of the accompanying drawing thus calls for an additional sulfuric acid wash in which, however, only very small amounts of ammonia are neutralized and which has dimensions substantially smaller than a sulfuric acid wash in the principal gas stream would have. The quantity of ammonia withdrawn from the ammonia cycle is therefore small and the consumption of sulfuric acid and the amount of ammonium sulfate obtained are accordingly low.

The two process variants have the common feature that the organic wash liquid remains in columns 1 and 2 for a fairly short period of time which amounts, for example, to 2 to 30 minutes, in order thereby to avoid a possible reaction of dissolved ammonia with the unsaturated nitriles. For this purpose, columns 1 and 2 may be united, for example, to form a combined wash-expelling column; if this is done, the inlet gas is introduced into the center portion of this combined column; the amount of wash liquid charged at the top of the column should then be increased correspondingly since the total amount of gas is increased by the quantity of expelling gas introduced into the sump of the column.

The off-gases obtained in the catalytical preparation of hydrocyanic acid or acrylonitrile generally contain considerable amounts of steam if the reaction is carried out under the action of oxygen or air. For their use in the process of the present invention, such gas mixtures, before entering the wash column 1, should be cooled approximately to the ambient temperature with condensation of the steam.

The present invention relates more particularly to a process for isolating and recovering hydrocyanic acid or mixtures of hydrocyanic acid with nitriles from gas mixtures containing ammonia, wherein the hydrocyanic acid or its mixtures with nitriles are removed from the ammonia-containing gas mixtures by washing them with liquid nitriles having a boiling point sufficiently different from that of the nitriles washed out, the dissolved hydrocyanic acid or its mixtures with nitriles being jointly isolated from the wash liquid by distillation, the off-gas escaping from the wash zone containing free ammonia, which can be isolated in known manner, for example, by subjecting the off-gas to a water wash.

The ammonia-containing gas mixtures include hydrocyanic acid and in addition thereto, for example, acrylonitrile, methacrylonitrile, propionitrile and acetonitrile, alone or in combination.

The liquids used for washing include the nitriles specified in the above "List of nitriles."

The gas mixture used as the starting material may also contain hydrocarbons and optionally air, or olefins such as propylene or isobutylene.

The process of the present invention can also be used for isolating hydrocyanic acid or mixtures thereof with nitriles from otherwise substantially pure ammonia.

In the process of the present invention the starting gas mixture is washed, in a first step, in a wash stage with a wash liquid, in which the gas flows countercurrently to the wash liquid, ammonia or residual gas containing ammonia is removed at the top of that wash stage, the wash liquid containing hydrocyanic acid and optionally nitriles is removed at the bottom of the wash stage and, in a second step, introduced approximately into the center portion of an expelling stage, in which residual ammonia is expelled by means of an expelling gas introduced approximately into the lower part of that expelling stage, the expelling gas is removed at the top of that expelling stage, fresh wash liquid is introduced into the expelling stage, the total amount of wash liquid together with the hydrocyanic acid washed out or the mixture thereof with the nitriles washed out is removed at the bottom portion of the expelling stage, optionally pre-heated and, in a third step, introduced approximately into the center portion of a distilling stage, in which the hydrocyanic acid or its mixtures with nitriles is isolated by distillation, regenerated wash liquid is removed from the sump of the distilling stage and recycled to the top of the wash stage and the expelling stage.

If the wash liquid present in the distilling stage contains but little hydrocyanic acid in addition to the nitriles, it can be distilled and thereby freed from the nitriles and the hydrocyanic acid, the nitriles and hydrocyanic acid being removed at the top portion of the distilling stage and cooled.

This operation can be carried out at atmospheric or reduced pressure. Alternatively, if the wash liquid present in the third or distilling stage contains considerable amount of hydrocyanic acid and optionally nitriles, it can be distilled while injecting an expelling gas and thereby freed from the hydrocyanic acid and the nitriles optionally present, the hydrocyanic acid and the nitriles, if any, being removed together with the expelling gas at the top of the distilling stage and, in a fourth step, introduced into the bottom portion of a dissolving stage charged from above with 1–2 N-mineral acid, in which the expelling gas escapes as the off-gas at the top of that dissolving stage, while the mineral acid solution containing hydrocyanic acid and optionally nitriles is optionally pre-heated and then introduced in a fifth step, into approximately the center portion of a heated distilling stage, in which said solution is distilled and thereby separated into its constituents, aqueous hydrocyanic acid and optionally nitriles are removed at the top portion of said heated distilling stage, while mineral acid is removed from the sump of said heated distilling stage and recycled to the top portion of the dissolving stage.

The expelling gases used include inert gases, such as air, nitrogen, carbon dioxide or gaseous hydrocarbons, for example propylene or a similar substance.

The wash liquid is allowed to remain in the wash and expelling stages for a period of time of about 2 to 30 minutes each.

The following examples serve to illustrate the invention, but they are not intended to limit it thereto:

*Example 1*

(Flow scheme of FIG. 1 of the accompanying drawing.)

82 g./hr. acrylonitrile and 18 g./hr. hydrocyanic acid were evaporated and combined with 30 l./hr. ammonia and 960 l./hr. air. The resulting gas mixture was introduced at 25° C. into wash column 1 which was charged through line 7 with 4.0 l./hr. β-ethoxypropionitrile at 25° C. After the wash operation, the wash liquid travelled approximately to the center portion of column 2 in which it flowed countercurrently to 110 l./hr. nitrogen at 25° C. introduced through line 12 into the bottom portion of column 2. At the top of column 2 0.3 l./hr. β-ethoxypropionitrile supplied through line 10 was atomized which rewashed substantially hydrocyanic acid. The wash liquid was conveyed via pre-heater 14 to distilling column 3 in which it was kept boiling (boiling point of β-ethoxypropionitrile: about 170° C.) by means of heater 15. A mixture containing acrylonitrile and hydrocyanic acid was removed at the top of column 3 respectively from separating vessel 18.

The following data were obtained by analysis:

| Starting gas mixture | Percent by volume | Mols./hr. |
|---|---|---|
| About 1,050 l./hr.: | | |
| Hydrocyanic acid (HCN) | 1.55 | 0.66 |
| Acrylonitrile (ACN) | 3.65 | 1.56 |
| Ammonia (NH₃) | 2.6 | 1.11 |
| Off-gas from wash tower (1), HCN | 0.01 | 0.004 |
| About 1,000 l./hr.: | | |
| ACN | 0.01 | 0.004 |
| NH₃ | 2.45 | 1.00 |
| Off-gas from column (2), HCN | <0.01 | |
| About 110 l./hr.: | | |
| ACN | <0.01 | |
| NH₃ | 2.25 | 0.10 |
| Product yield per hour: | | |
| ACN—80.2 g.=98 weight percent, calculated on amount evaporated. | | |
| HCN—17.5 g.=97 weight percent, calculated on amount evaporated. | | |

*Example 2*

(Flow scheme of FIG. 2 of the accompanying drawing.)

980 l./hr. air, 50 l./hr. NH₃ and 40 l./hr. HCN-gas were introduced at 250° C. into wash tower 1 which was charged from about with about 3.5 l./hr. β-ethoxypropionitrile at 25° C. The wash liquid was expelled in column 2 by injecting 110 l./hr. nitrogen and 0.3 l./hr. β-ethoxypropionitrile was introduced into the top of column 2 which rewashed HCN. The wash liquid travelled from column 2 through pre-heater 14 at a temperature of 85 to 95° C. to expelling column 33 in which hydrocyanic acid including the residual NH₃-traces was expelled with 200 l./hr. air, the sump of the expelling column being maintained at a temperature of 75 to 80° C. Cooler 22 was fed with water at 12° C. and avoided substantial losses of wash liquid. The gas mixture was passed to sulfuric acid wash tower 4 supplied with 1.5 l./hr. 2 N-sulfuric acid. The sulfuric acid containing hydrocyanic acid was then conveyed through pre-heater 26 to distilling column 5 at the top of which hydrocyanic acid was removed at a reflux ratio of about 1.

The following data were obtained by analysis:

| | Percent by volume | Mols./hr. |
|---|---|---|
| Starting mixture used, NH₃ | 4.4 | 1.92 |
| About 1,070 l./hr., HCN | 3.1 | 1.35 |
| Off-gas from wash tower (1), NH₃ | 4.2 | 1.77 |
| About 1,030 l./hr., HCN | 0.01 | 0.004 |
| Off-gas from column (2), NH₃ | 3.3 | 0.15 |
| About 110 l./hr., HCN | 0.01 | ¹ 0.0005 |

¹ About.

| | Weight percent | Mol./hr. |
|---|---|---|
| The wash liquid (about 3.5 l./hr.) in the sump of the expelling column (33) contained: | | |
| NH₃ | 0.003 | About 0.0005=0.009. |
| HCN | 2.0 mg./10 cc | 0.025=0.70 g. |

35.1 g./hr. hydrocyanic acid, corresponding to 1.3 mols./hr.-96.5% by weight, of the hydrocyanic acid contained in the starting gas mixture were removed at the top of distilling column 5.

We claim:

1. A process for isolating and recovering at least one substance selected from the group consisting of hydrocyanic acid and nitriles from ammonia-containing gas mixtures, which comprises removing in a washing step at least one substance selected from the group consisting of hydrocyanic acid and nitriles from the ammonia-containing gas mixture used as the starting gas mixture by washing said gas mixture with at least one liquid nitrile selected from the group consisting of β-methoxypropionitrile, β-ethoxypropionitrile, β-n-propoxypropionitrile, β-i-propoxypropionitrile, β - n-butoxypropionitrile, β-i-butoxypropionitrile, β-pentoxypropionitrile, β,β'-dicyanodiethylether, β - cyclopentoxypropionitrile, β-cyclohexoxypropionitrile, and β-benzoxypropionitrile as the wash liquid having a boiling point sufficiently different from that of the nitriles washed out and thereby permitting the nitriles to be isolated by distillation, the said hydrocyanic acid and the said nitrile being dissolved thereby, distilling and thereby isolating the dissolved substances which are selected from the group consisting of hydrocyanic acid and nitriles from the wash liquid by common distillation, and recovering free ammonia contained in the off-gas escaping from the washing step.

2. The process of claim 1, wherein the ammonia is recovered from the off-gas by washing the off-gas with water.

3. The process of claim 1, wherein the ammonia-containing gas mixture used as the starting material also contains hydrocyanic acid and in addition thereto as nitrile at least one substance selected from the group consisting of acrylonitrile, methacrylonitrile, propionitrile and acetonitrile.

4. The process of claim 1, wherein the gas mixture used as the starting material also contains at least one substance selected from the group consisting of hydrocarbons, air and oxygen.

5. The process of claim 4, wherein the hydrocarbons are olefins.

6. The process of claim 5, wherein the olefins are selected from at least one member of the group consisting of propylene and isobutylene.

7. The process of claim 1, wherein at least one substance selected from the group consisting of hydrocyanic acid and nitriles is isolated from otherwise substantially pure ammonia.

8. The process of claim 1, wherein the ammonia-containing starting gas mixture is introduced, in a first step, into a wash stage in which the gas mixture flows countercurrently to the washing liquid with which it is washed, at least one substance selected from the group consisting of ammonia and residual ammonia-containing gas is removed at the top of the wash stage, the wash liquid containing at least one substance selected from the group consisting of hydrocyanic acid and nitriles is removed at the bottom portion of the wash stage and, in a second step, introduced approximately into the center portion of an expelling stage, in which residual ammonia is expelled by injecting an expelling gas into the bottom portion of the expelling stage, the gas in said expelling stage is removed at the top of said expelling stage, fresh wash liquid is introduced into the expelling stage, the total amount of wash liquid together with at least one of the substances washed out, which are selected from the group consisting of hydrocyanic acid and nitriles, is removed at the bottom portion of the expelling stage and, in a third step, introduced approximately into the center portion of a distilling stage, in which the wash liquid is distilled and at least one substance selected from the group consisting of hydrocyanic acid and nitriles thereby separate from the wash liquid, regenerated wash liquid is removed from the sump of the distilling stage and recycled to the top of the wash stage and expelling stage.

9. The process of claim 8, wherein the total wash liquid containing at least one substance selected from the group consisting of hydrocyanic acid and nitriles is first preheated and then introduced into the distilling stage.

10. The process of claim 8, wherein the wash liquid present in the distilling stage is distilled and thereby freed from the nitriles and the hydrocyanic acid, the nitriles and the hydrocyanic acid being removed at the top of the distilling stage, cooled and collected.

11. The process of claim 10, wherein the wash liquid in addition to the nitriles contains but small amounts of hydrocyanic acid corresponding to a molar ratio of hydrocyanic acid to nitrile of ≦3:7.

12. The process of claim 8, wherein atmospheric pressure is used in the distilling stage.

13. The process of claim 8, wherein reduced pressure is used in the distilling stage.

14. The process of claim 8, wherein the wash liquid present in the distilling stage is distilled while injecting an expelling gas and thereby freed from at least one substance selected from the group consisting of hydrocyanic acid and nitriles, the hydrocyanic acid and the nitriles are removed together with the expelling gas from the top portion of the distilling stage and, in a fourth step, introduced approximately into the bottom portion of a dissolving stage charged from above with 2 N-aqueous sulfuric acid, the expelling gas is withdrawn at the top portion of the dissolving stage, the resulting sulfuric acid solution, which contains hydrocyanic acid and nitriles, is introduced, in a fifth step, into approximately the center portion of a heated distilling stage in which the said solution is distilled and thereby separated into its constituents, the resulting aqueous hydrocyanic acid and nitriles are removed at the head of said heated distilling stage, the sulfuric acid is withdrawn from the sump of said heated distilling stage and recycled to the top of the said dissolving stage.

15. The process of claim 14, wherein the wash liquid in addition to the nitriles contains considerable amounts of hydrocyanic acid corresponding to the molar ratio of hydrocyanic acid to nitrile of >3:7.

16. The process of claim 14, wherein the sulfuric acid solution containing at least one substance selected from the group consisting of hydrocyanic acid and nitriles is first preheated and then introduced into said heated distilling stage.

17. The process of claim 8, wherein the expelling gas used in the various stages are inert gases selected from the group consisting of air, nitrogen, carbon dioxide, and gaseous hydrocarbons.

18. The process of claim 17, wherein the gaseous hydrocarbon is propylene.

19. The process of claim 8, wherein the wash liquid is allowed to remain in the wash stage and in the expelling stage for period of time of 2 to 30 minutes each.

References Cited by the Examiner

UNITED STATES PATENTS 2,803,642  8/1957  Fierce et al. _____ 23—151 X

OTHER REFERENCES

"The Chemistry of Acrylonitrile," American Cyanamid Company, Petrochemicals Department, 2nd ed., 1959, New York, N.Y., p. 3.

OSCAR R. VERTIZ, *Primary Examiner.*

MAURICE A. BRINDISI, *Examiner.*

E. C. THOMAS, *Assistant Examiner.*